(12) United States Patent
Wang et al.

(10) Patent No.: US 9,825,557 B2
(45) Date of Patent: Nov. 21, 2017

(54) IMPULSE GENERATOR AND GENERATOR SET

(71) Applicant: Beijing Institute of Nanoenergy and Nanosystems, Beijing (CN)

(72) Inventors: Zhonglin Wang, Beijing (CN); Guang Zhu, Beijing (CN); Zonghong Lin, Beijing (CN)

(73) Assignee: Beijing Institute of Nanoenergy and Nanosystems, Beijing (CN)

( * ) Notice: Subject to any disclaimer, the term of this patent is extended or adjusted under 35 U.S.C. 154(b) by 232 days.

(21) Appl. No.: 14/648,189

(22) PCT Filed: Nov. 26, 2013

(86) PCT No.: PCT/CN2013/087820
§ 371 (c)(1),
(2) Date: May 28, 2015

(87) PCT Pub. No.: WO2014/082651
PCT Pub. Date: Jun. 5, 2014

(65) Prior Publication Data
US 2015/0311823 A1    Oct. 29, 2015

(30) Foreign Application Priority Data
Nov. 30, 2012    (CN) .......................... 2012 1 0506295

(51) Int. Cl.
*H02N 1/04*    (2006.01)
(52) U.S. Cl.
CPC ..................... *H02N 1/04* (2013.01)
(58) Field of Classification Search
CPC .......... H02N 1/04; H02N 1/004; H02N 11/00; H02N 11/002; H02N 1/006
(Continued)

(56) References Cited

U.S. PATENT DOCUMENTS 2,392,429 A * 1/1946 Sykes ..................... H03H 9/09
29/25.35
9,595,894 B2 * 3/2017 Wang .................. H02N 11/002
(Continued)

FOREIGN PATENT DOCUMENTS

CN    102290968    12/2011
CN    102684546    9/2012
(Continued)

OTHER PUBLICATIONS

Extended European Search Report, issued in the corresponding European Patent Application No. 13859243.1, dated Jul. 14, 2016, 7 pages.
(Continued)

*Primary Examiner* — Forrest M Phillips
(74) *Attorney, Agent, or Firm* — Hamre, Schumann, Mueller & Larson, P.C.

(57) ABSTRACT

The present disclosure provides an impulse generator and a generator set. The impulse generator comprises: a first substrate; a first conductive film layer on the first substrate; an insulation film layer on the first conductive film layer; a second substrate; a second conductive film layer on the second substrate; and an elastic connection body for connecting the first substrate with the second substrate such that the insulation film layer and the second conductive film layer face each other; wherein, when no external force is applied on the first substrate or the second substrate, the insulation film layer is separated from the second conductive film layer; and, when an external force is applied on the first substrate or the second substrate, the insulation film layer is contacted with the second conductive film layer such that, a surface charge transfer is generated by the contact between the insulation film and the second conductive film layer, owing to their difference in triboelectric series. For the impulse generator according to the present disclosure, when (Continued)

a periodic external force is applied on the substrate of the generator, AC pulse signal output may be formed between the first conductive film layer and the second conductive film layer.

18 Claims, 5 Drawing Sheets

(58) Field of Classification Search
USPC .................................. 310/300, 312, 329
See application file for complete search history.

(56) References Cited

U.S. PATENT DOCUMENTS

| | | | | |
|---|---|---|---|---|
| 2010/0295415 | A1* | 11/2010 | Despesse | H02N 1/08 310/300 |
| 2011/0148248 | A1* | 6/2011 | Landa | H01J 45/00 310/306 |
| 2011/0163630 | A1* | 7/2011 | Klootwijk | B06B 1/0292 310/300 |
| 2012/0086307 | A1* | 4/2012 | Kandori | H02N 1/006 310/300 |
| 2014/0084748 | A1* | 3/2014 | Wang | H02N 1/04 310/300 |
| 2015/0123513 | A1* | 5/2015 | Kim | H02N 1/08 310/300 |
| 2015/0137659 | A1* | 5/2015 | Nabeto | H02N 1/08 310/300 |
| 2015/0222203 | A1* | 8/2015 | Kim | H02N 1/04 310/310 |
| 2016/0043387 | A1* | 2/2016 | Kalaiselvi | H01M 4/366 429/223 |

FOREIGN PATENT DOCUMENTS

| | | |
|---|---|---|
| CN | 102710166 | 10/2012 |
| CN | 103368458 | 10/2013 |
| JP | 60032061 | 2/1985 |
| JP | 03179364 | 8/1991 |
| JP | 10225145 | 8/1998 |
| JP | 2012010564 | 1/2012 |

OTHER PUBLICATIONS

Wang et al., "Nanoscale Triboelectric-Effect-Enabled Energy Conversion for Sustainably Powering Portable Electronics", Nano Letters, American Chemical Society, vol. 12, No. 12, pp. 6339-6346, Nov. 6, 2012.

Chinese Office Action issued in the corresponding Chinese Application No. 201210506295.0, dated Dec. 26, 2014, 17 pages.

International Search Report and Written Opinion issued in the corresponding International Application No. PCT/CN2013/087820, dated Feb. 27, 2014, 10 pages.

Wang et al., "Nanoscale Triboelectric-Effect-Enabled Energy Conversion for Sustainably Powering Portable Electronics", Nano Letters, American Chemical Society, Nov. 6, 2012, 8 pages.

* cited by examiner (a)            (b)

IMPULSE GENERATOR AND GENERATOR SET

BACKGROUND

Technical Field

The present disclosure relates to an electric generator, particularly to an impulse generator and a generator set which convert mechanical energy applied by an external force into electric energy.

Description of the Related Art

With the development of microelectronics and material technology at top speed nowadays, a large number of newly multifunctional and highly integrated microelectronic devices are being developed all the time and exhibit a great prospect hitherto in all aspects of people's daily lives. However, research on the power-supply systems matching with these microelectronic devices relatively lags behind. Generally, power supplies for these microelectronic devices are directly or indirectly from electric batteries. However, electric batteries not only are bulky and heavy, but also have potential hazards to health and the environment due to its contained toxic chemicals. Accordingly, it is greatly important to develop a technology of converting these mechanical energies that occur naturally, such as motions and vibrations, into electric energy.

SUMMARY

The present disclosure provides an impulse generator comprising:
a first substrate;
a first conductive film layer on the first substrate;
an insulation film layer on the first conductive film layer;
a second substrate;
a second conductive film layer on the second substrate; and an elastic connection body for connecting the first substrate with the second substrate such that the insulation film layer and the second conductive film layer face each other;
wherein, when no external force is applied on the first substrate or the second substrate, the insulation film layer is separated from the second conductive film layer; and, when an external force is applied on the first substrate or the second substrate, the insulation film layer contacts with the second conductive film layer to generate a surface charge transfer between the insulation film layer and the second conductive film layer.

Correspondingly, the present disclosure also provides an impulse generator set, comprising a plurality of abovementioned impulse generators stacked vertically with one another; wherein,
in every two adjacent impulse generators of the plurality of impulse generators, a first impulse generator is on a second impulse generator, wherein the second substrate of the first impulse generator is the first substrate of the second impulse generator, and
series connections and/or parallel connections are formed among the plurality of impulse generators.

BRIEF DESCRIPTION OF THE DRAWINGS

The above and other objective, features and advantages of the present disclosure will become more apparent by describing in detail exemplary embodiments thereof with reference to the accompanying drawings, wherein, in order to emphasize on the subject matter of the present disclosure, the like reference numerals refer to the like elements and the figures are not drawn in scale, in which.

DETAILED DESCRIPTION OF THE EMBODIMENTS

Technical solution of the present disclosure will be described completely and clearly hereinafter in detail with reference to the attached drawings. The present disclosure may, however, be embodied in many different forms and should not be construed as being limited to the embodiment set forth herein. Rather, on the basis of the embodiment set forth herein, all other embodiments made by those skilled in the art without involving any inventive steps fall into the scope of the present disclosure.

Furthermore, exemplary embodiments of the present disclosure will be described hereinafter in detail with reference to the attached drawings. For clear purposes, the attached drawings are only schematic and should not be construed as being limited to the embodiments set forth herein.

With development of microelectronics and material technology at top speed nowadays, a large number of newly multifunctional and highly integrated microelectronic devices are being developed all the time and exhibit a great prospect hitherto in all aspects of people's daily lives. Accordingly, it is greatly important to develop a technology of converting these mechanical energies that occur naturally, such as motions and vibrations, into electric energy, so as to achieve these microelectronic devices without external power supply. The present disclosure provides an impulse generator having simple construction and used for converting mechanical energies that occur naturally, such as motions and vibrations, into electric energy to provide a power-supply matched with the microelectronic devices. The present disclosure aims to provide an impulse generator and a generator set which convert mechanical energy applied on the impulse generator by an external force into electric energy, so as to provide power supply for microelectronic devices. The impulse generator according to the present disclosure can convert mechanical energy applied by an external force into electric energy by means of phenomenon of a surface charge transfer generated by the contact between these materials with relatively great polarity difference therebetween in triboelectric series, so as to directly charge these microelectronic devices, such as LEDs.

Figure 1:
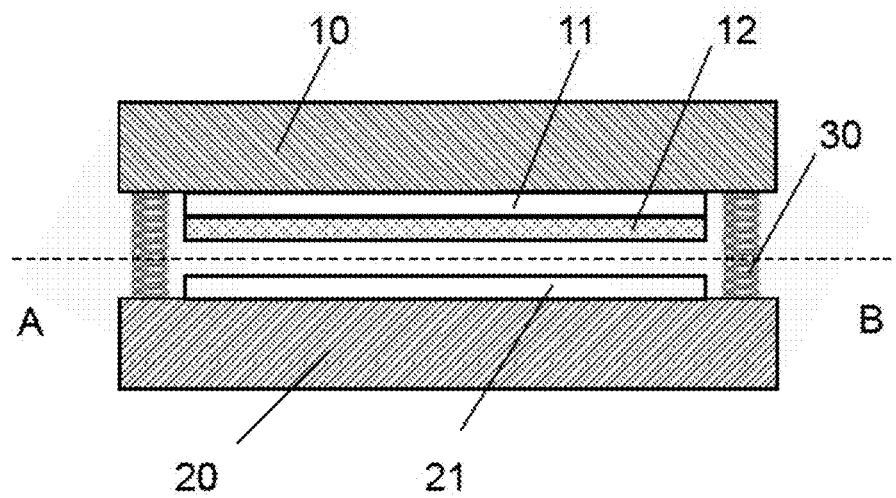
FIG. 1 is a schematic structural view of an impulse generator according to the present disclosure.
Figure 2:
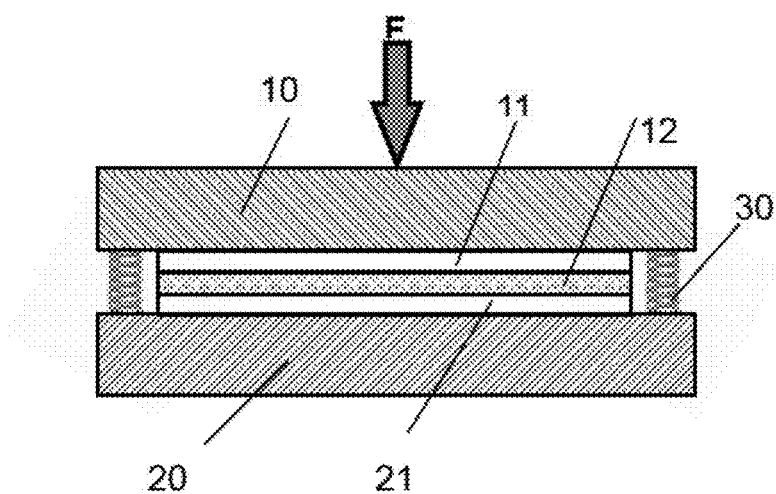
FIG. 2 is a schematic structural view of an impulse generator according to the present disclosure on which an external force is applied.

FIG. 1 shows a fundamental structure of the impulse generator according to the present disclosure. The impulse generator comprises a first substrate 10; a first conductive film layer 11 on the first substrate; an insulation film layer 12 on the first conductive film layer; a second substrate 20; and a second conductive film layer 21 on the second substrate; and an elastic connection body 30. The elastic connection body 30 is used for connecting the first substrate 10 with the second substrate 20 such that the insulation film layer 12 and the second conductive film layer 21 face each other. When no external force is applied on the first substrate 10 or the second substrate 21, the insulation film layer 12 is separated from the second conductive film layer 21; that is, the insulation film layer 12 is apart from the second conductive film layer 21 by a space. Referring to FIG. 2, when an external force F is applied on the first substrate 10 or the second substrate 21, the insulation film layer 12 is in contact with the second conductive film layer 21 such that, a surface charge transfer is generated between the insulation film 12 and the second conductive film layer 21.

In the impulse generator according to the present disclosure, the second conductive film layer 12 preferably has the same shape as that of the insulation film layer 21 such that, when an external force is applied on the first substrate or the second substrate, the insulation film layer 12 is completely in contact with the second conductive film layer 21, as shown in FIG. 2.

Specifically, the surface charge transfer generated between the insulation film 12 and the second conductive film layer 21 means that there is a difference in triboelectric series between the materials for the insulation film layer 12 and the second conductive film layer 21. Here, the term of "triboelectric series" means the materials are ordered by the degrees of their attraction to charge. At the moment when two materials contact with each other, positive charges on the contact surface are transferred from the surface of one material that has a relatively negative polarity in triboelectric series to the surface of the other material that has a relatively positive polarity in triboelectric series. So far, there is no uniform theory that interprets completely the mechanism of charge transfer. It is generally recognized that such charge transfer is related with the surface work function of a material, and the charge transfer is achieved by transfer of electrons or ions on the surfaces. It should be further explained that the charge transfer requires a contact, instead of a relative friction, between two materials.

Figure 3:
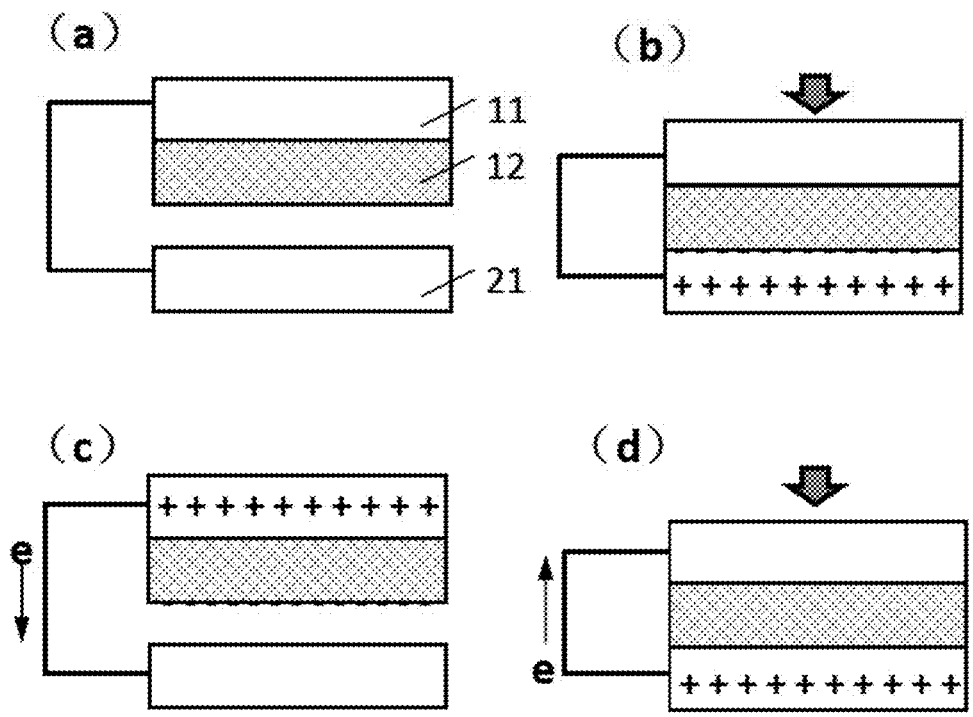
FIG. 3 is a schematic principle view of an impulse generator according to the present disclosure.

FIG. 3 shows an operating principle of the impulse generator according to the present disclosure. When no external force is applied on the first substrate or the second substrate, the insulation film layer 12 is separated from the second conductive film layer 21, as shown in (a) of FIG. 3; and, when an external force (which is shown by an arrow) is applied on the first substrate 12 or the second substrate 21, the insulation film layer 21 is brought in contact with the second conductive film layer 12, at that moment, a surface charge transfer is generated, to form a layer of surface contacting charges, as shown in (b) of FIG. 3. Since the material for the insulation film layer 12 and that for the second conductive film layer 21 have different positions in triboelectric series, negative charges are generated on the surface of the insulation film layer 12 while positive charges are generated on the surface of the second conductive film layer 21 and the two kinds of charges have the same quantities. When the external force is removed, the insulation film layer 12 is separated from the second conductive film layer 21 by a space, owing to recovery of the elastic connection body 30. Due to existence of the space, repulsive force of the negative charges on the surface of the insulation film layer 12 to the electrons on the first insulation film layer 12 is greater than attraction force of the positive charges on the surface of the second conductive film layer 21 to the electrons on the first insulation film layer 12. Accordingly, the electrons will flow from the first conductive film layer 12 through an external circuit to a second conductive film layer 21 and positive charges are generated on the first conductive film layer 12, referring to an arrow shown in (c) of FIG. 3. In this process, an instant pulse current which goes through the external circuit/the loads is generated. When an external force is applied again, under the action of the repulsive force of the negative charges on the insulation film layer 12, the electrons on the second conductive film layer 21 go back to the first conductive film layer 12, to generate a reverse direction instant current, referring to an arrow shown in (d) of FIG. 3. In this way repeatedly, an AC impulse current is generated.

In the impulse generator according to the present disclosure, the first conductive film layer is made of a conductive material, at the same time, as one electrode of the generator, there is no special requirement on kinds of the material for the first conductive film layer, metal films such as Cu, Al, etc. manufactured by methods such as electron beam evaporation, plasma sputtering, and so on, may be used. The second conductive film layer is made of a conductive material, at the same time, as the other electrode of the generator, there is no special requirement on kinds of the material for the second conductive film layer, metal films Cu, Al, etc. having flat and smooth surfaces, manufactured by methods such as electron beam evaporation, plasma sputtering, and so on, may be used. The insulation film layer is made of a non-conductive material which is required to have a relatively great polarity difference in triboelectric series from the second conductive film layer. Available materials for the insulation film include but are not limited to polytetrafluoroethylene film, polydimethylsiloxane (PDMS) film, and the like.

Figure 4:
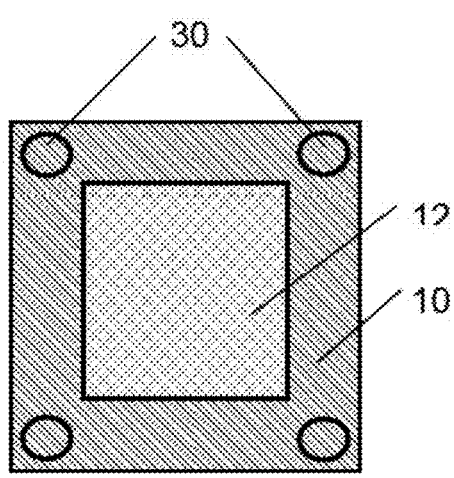
FIGS. 4 and 5 are schematic sectional views of an impulse generator according to the present disclosure.
Figure 5:
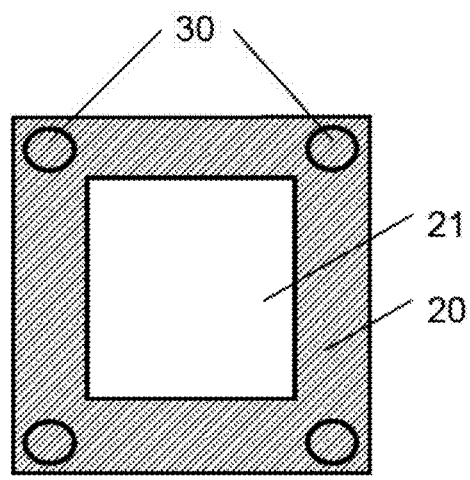

In the impulse generator according to the present disclosure, non-deformable and rigid materials are used for the first substrate and the second substrate, in the present disclosure, there is no special requirement on kinds of the material for the first substrate and the second substrate as long as they can resist mechanical shocks, for example, organic glass sheet, PE sheet, PVC sheet, and the like. The elastic connection body is provided to connect and support the first substrate and the second substrate, and maintains the separation of the second conductive film layer from the insulation film layer by a space that is a distance between the insulation film layer and the second conductive film layer generally greater than a thickness of the insulation film layer, by one or more orders of magnitude. Elastic materials, such as one or more springs, organic elastomer and the likes, may be used for the elastic connection body. FIGS. 1 and 2 only schematically show the elastic connection body in the form of springs. Shape and location of the elastic connection body depends on the shape of the first substrate, the first conductive film layer, the insulation film layer, the second substrate or the second conductive film layer. A configuration that a plurality of springs is around the insulation film layer may be used. FIGS. 4 and 5 are sectional views along the broken line AB in FIG. 1. FIG. 4 is a sectional view showing an upper half of the impulse generator in FIG. 1 while FIG. 5 is a sectional view showing a lower half of the impulse generator in FIG. 1. The insulation film layer 12 and the second conductive film layer 21 are both in the square shape and are respectively located in the middles of the first substrate 10 and the second substrate 20. The elastic connection body includes four springs respectively located around the insulation film layer 12 and the second conductive film layer 21 and connected with the first substrate 10 and the second substrate 20. Locations of the four springs preferably are located at the four apex corners of the square shaped insulation film layer 12 and second conductive film layer 21.

In the impulse generator according to the present disclosure, the elastic connection body may also be configured that a ring of elastic material is attached to the second substrate around the second conductive film layer, for example, elastic rubber or spring around the second conductive film layer and used for connecting the first substrate with the second substrate. In the impulse generator according to the present disclosure, configuration and location of the elastic connection body should not be construed as being limited to the embodiments of the present disclosure.

In the preferred embodiment of the present disclosure, a metal copper film layer of 100 nm in thickness and 5 cm×7 cm in size may be used as the first conductive film layer, a PDMS film layer of 10 micrometer in thickness and 5 cm×7 cm in size may be used as the insulation film layer, a metal aluminum film layer of 10 nm in thickness may be used as the second conductive film layer, and the first substrate and the second substrate are connected by springs. When no external force is applied on the first substrate or the second substrate, the metal aluminum film layer is separated from the PDMS film layer by a space of 1 mm, that is, the distance between the metal aluminum film layer and the PDMS film layer is 1 mm.

Since the PDMS material has a very negative polarity in triboelectric series while the metal aluminum has a relatively positive polarity in triboelectric series, combination of the materials in the present embodiment favours improvement of the output of the impulse generator.

Figure 6:
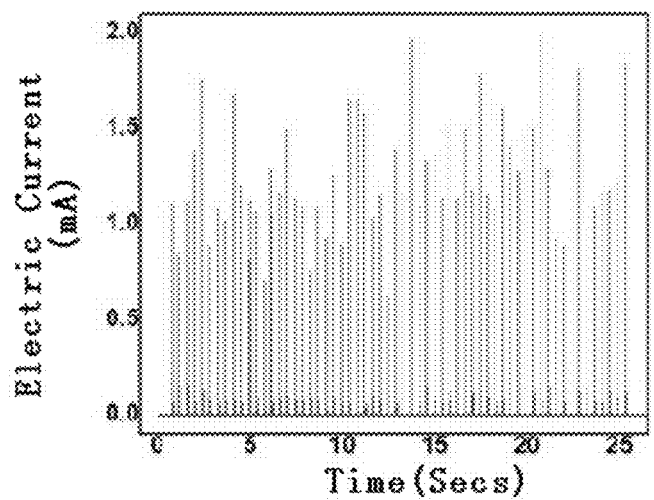
FIG. 6 is a view showing a short-circuit current output when an impulse generator according to the present disclosure is beaten by the palm.

Lead wires are drawn from the metal aluminum film layer and the metal copper film layer of the abovementioned impulse generator to a full bridge rectifier such that the AC current output generated by the impulse generator is converted into DC current output. FIG. 6 shows a diagram of short-circuit current output, which has an instant current peak of about 2 mA, achieved when the first substrate or the second substrate of the impulse generator is beaten by the adult's palms.

Figure 7:
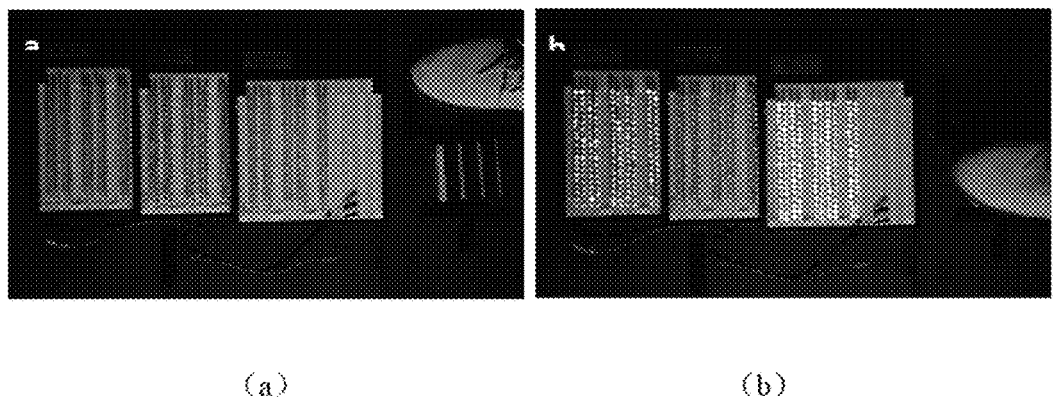
FIG. 7 is a real time view showing 600 commercial LED light bulbs are lightened up when an impulse generator according to the present disclosure is trampled by feet.

The inventor has found that, in case that Lead wires are drawn from the metal aluminum film layer and the metal copper film layer of the abovementioned impulse generator to 600 commercial LED light bulbs, as shown in FIG. 7, in which, in (a) of FIG. 7, no external force is applied on the impulse generator and the LED light bulbs are not lighted up, and, in (b) of FIG. 7, the impulse generator is trampled by adult's feet and the LED light bulbs are lighted up. With the above result of the experiment, it is indicated that, the impulse generator according to the present embodiment may be used to power up to 600 commercial LED light bulbs in real time, without any additional external power supplies.

In an embodiment of the present disclosure, surface(s) of the second metallic film layer and/or the insulation film layer is/are physically modified to be distributed with microstructure array in micron or submicron dimension, in order to increase the contact area between the second metallic film layer and the insulation film layer so as to increase quantity of the contact charges. In one embodiment, silicon slice is used as the second substrate and is spin coated with a layer of photoresist, a square window array with its side-length in micron or submicron dimension is formed on the photoresist by a lithographic process; the second substrate after implementation of the lithographic process is processed by a thermal chemical etching with potassium hydroxide, to form a array having a pyramid shaped depression structure, at the window; after that, a metal aluminum film is deposited by an evaporation or sputtering process to act as the second metallic film layer of the two kinds of contact materials. PDMS is used as the material for insulation film layer, and, when the two kinds of materials, i.e., the metal aluminum film and the PDMS, are in contact and squeezed with each other under the action of an external force, the depression structure may receive the PDMS and be filled with it due to good elasticity of the PDMS, thereby increasing the contact area compared with a smooth surface. In another embodiment, an nanowires array is manufactured by implementing an inductive coupling plasma etching process on the surface of the insulation film layer, for example, *aurum* of about 10 nm in thickness is deposited on the surface of the insulation film layer by use of sputtering apparatus, after that, polyimide film is placed into an inductive coupling plasma etching machine, and the etching is implemented on the surface where the *aurum* is deposited, by providing a gas of $O_2$, Ar and $CF_4$ with a flow rate of 10 sccm, 15 sccm, 30 sccm, a pressure of 15 mTorr, a working temperature of 55'C and a power of 400 watt, in order to produce the plasma, wherein the power of 100 watt is used to accelerate the plasma and the etching is sustained for about 5 minutes. As a result, a macromolecule polyimide nanorods array of about 1.5 micrometer in length, substantially perpendicular to the insulation film layer, is obtained.

In other embodiments of the present disclosure, surface(s) of the second metallic film layer and/or the insulation film layer is/are physically modified such that the surface(s) to be distributed with microstructure array in micron or submicron dimension, in order to increase the contact area between the second metallic film layer and the insulation film layer so as to increase quantity of the contact charges.

In the impulse generator according to the present disclosure, surface(s) of the second metallic film layer and/or the insulation film layer in contact with each other is/are chemically modified to further increase quantity of the transferred charges at the contact moment, so as to improve density of the contact charges and output power of the impulse generator. There are two methods of chemical modifications as follows.

In one method, as to the materials for the second metallic film layer and the insulation film layer in contact with each other, a functional group (i.e., a strong electron-donating group) which is prone to lose electrons is introduced into a positive polarity material surface, or a functional group (i.e., a strong electron-accepting group) which is prone to accept electrons is introduced into a negative polarity material surface, either of which is capable of further increasing an amount of the transferred charges at the contact moment, so as to improve density of the contact charges and output power of the impulse generator. The strong electron donating group comprises amino group, hydroxyl group, alkoxy group and the like. The strong electron-accepting group comprises acyl group, carboxyl group, nitro group and the like. In one embodiment, a metal aluminum film may be used as the second conductive film layer while a PDMS film may be used as the insulation film layer. It may further increase density of contact charges as the strong electron-accepting group is introduced into the PDMS surface. The method of introducing a strong electron-accepting group, such as nitro group, into the PDMS surface may include implementing a plasma surface modification process at an atmosphere of mixed gas of oxygen and nitrogen to produce the plasma under certain power, so as to achieve introduction of the amino group into the surface of polyimide.

The other method is a chemical modification method of introducing positive charges into a positive polarity material surface while introducing negative charges into a negative polarity material surface. In one embodiment, surface of the insulation film layer is modified with organic molecules by means of chemical key bonding, to electrify the insulation film layer with electric charges, for example, surface of a polydimethylsiloxane (PDMS) electrode is modified with tetraethyl silicate (TEOS) by means of hydrolytic condensation (sol-gel), to electrify it with negative charges. In another embodiment, surface of the second metallic film layer is modified with charged nano material, that is, to electrify the surface of the nano material with electric charges such that the second metallic film layer is electrified, for example, a metal film layer is modified with gold nanoparticles containing Cetyltrimethyl Ammonium Bromide (CTAB) on the surface thereof by means of gold-sulfur key bonding. As the Cetyltrimethyl Ammonium Bromide acts as positive ion, the whole second metallic film layer will become positive in electricity.

Correspondingly, the present disclosure also provides an impulse generator set comprising a plurality of abovementioned impulse generators stacked vertically with one another. In every two vertically adjacent impulse generators of the plurality of impulse generators, a first impulse generator is located on a second impulse generator, wherein the second substrate of the first impulse generator is the first substrate of the second impulse generator; and series connections and/or parallel connections are formed among the plurality of impulse generators. That is, the plurality of impulse generators are supposed vertically with one another and series connections and/or parallel connections are formed among the plurality of impulse generators, as a result, the achieved generator set may improve output power of the device, compared with the impulse generator.

Figure 8:
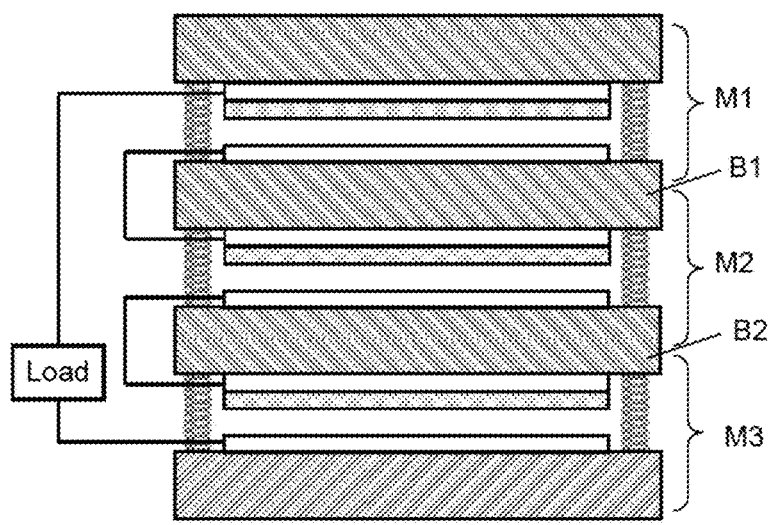
FIGS. 8 and 9 are schematic structural views of these embodiments of an impulse generator set according to the present disclosure.

FIG. 8 shows one embodiment of the impulse generator set. The impulse generator set comprises impulse generators M1, M2 and M3. The impulse generator M2 is located on the impulse generator M3 while the impulse generator M1 is located on the impulse generator M2. In two adjacent impulse generators M1 and M2, the second substrate B1 of the first impulse generator M1 is the first substrate of the second impulse generator M2. In two adjacent impulse generators M2 and M3, the second substrate B2 of the first impulse generator M2 is the first substrate of the second impulse generator M3. In the present disclosure, one substrate is shared by two vertically adjacent impulse generators. Similar manner may be applied by analogy in these cases including more impulse generators, which is omitted herein. In the plurality of impulse generators M1, M2 and M3, the first conductive film layers of all of the impulse generators are connected together through a conductive structure and the second conductive film layers of all of the impulse generators are connected together through a conductive structure, as a result, the achieved impulse generator set may be used as power supply for loads such as electrical appliances, electric batteries and the like. The conductive structure mentioned in the present disclosure may be common conductive materials, such as lead wire, metal film and the like.

Figure 9:
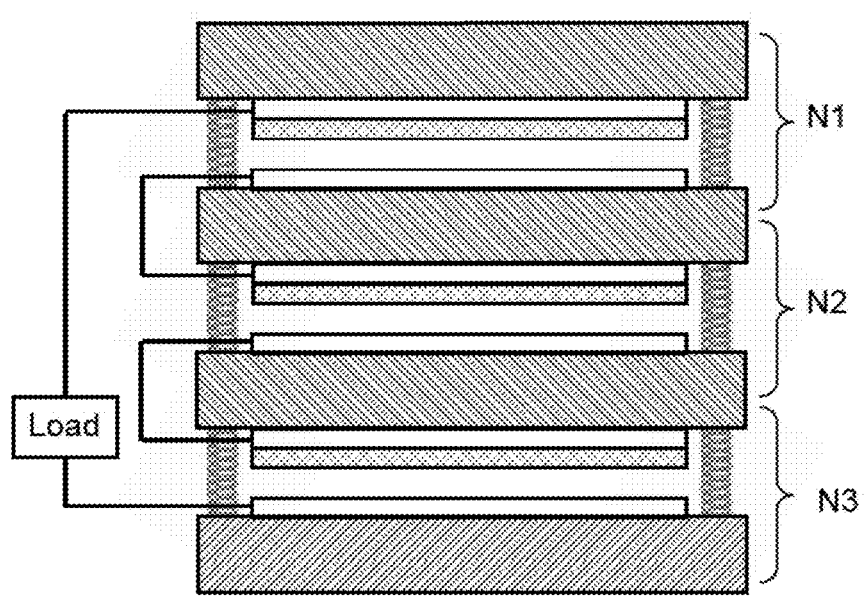

FIG. 9 shows another embodiment of the impulse generator set. The impulse generator set comprises impulse generators N1, N2 and N3. The impulse generator N2 is located on the impulse generator N3 while the impulse generator N1 is located on the impulse generator N2. The stacked manner among the plurality of impulse generators is the same as that in FIG. 8. Series connections are formed among the plurality of impulse generators, where, in two vertically adjacent impulse generators N1 and N2, the second conductive film layer of the first impulse generator N1 is connected with the first conductive film layer of the second impulse generator N2 through a conductive structure. Similarly, the second conductive film layer of the second impulse generator N2 is connected with the first conductive film layer of the impulse generator N3 through a conductive structure. As a result, the achieved impulse generator set may be used as power supply for loads such as electrical appliances, electric batteries and the likes.

The conductive structure mentioned in the present disclosure may be common conductive materials, such as lead wire, metal film and the like. Materials and configurations for the impulse generators of the impulse generator set according to the present disclosure may be the same, or else may be different.

The impulse generator set according to the present disclosure may be further arranged along the horizontal direction, that is, the impulse generator sets shown in FIG. 8 or FIG. 9 are stacked along the horizontal direction, and series connections or parallel connections are formed among these impulse generator sets, forming an impulse generator set with greater output power.

Conventional semiconductor material manufacturing technology may be used as a method for manufacturing these parts of the impulse generator and the impulse generator set according to the present disclosure, which will not be explained specifically herein.

Compared with the prior art, the impulse generator and the generator set according to the present disclosure have the following advantages.

The present disclosure provides an impulse generator and a generator set. The impulse generator comprises: a first substrate; a first conductive film layer on the first substrate; an insulation film layer on the first conductive film layer, a second substrate; a second conductive film layer on the second substrate; and an elastic connection body for connecting the first substrate with the second substrate such that the insulation film layer and the second conductive film layer face each other; wherein, when no external force is applied on the first substrate or the second substrate, the insulation film layer is separated from the second conductive film layer; and, when an external force is applied on the first substrate or the second substrate, the insulation film layer is in contact with the second conductive film layer to generate a surface charge transfer between the insulation film layer and the second conductive film layer. For the impulse generator according to the present disclosure, the surface charge transfer is generated by the contact between the insulation film and the second conductive film layer, owing to their difference in triboelectric series. Accordingly, when a periodic external force is applied on the substrate (the first substrate or the second substrate) of the generator, AC pulse signal output can be formed between the first conductive film layer and the second conductive film layer, which powers the microelectronic devices such as LEDs without additional power supplies.

The plurality of impulse generators are stacked vertically with one another such that one substrate is shared by two adjacent impulse generators, and series connections and/or parallel connections are formed among the plurality of impulse generators to form the generator set such that greater amount of output may be achieved when the generator set is applied with an external force.

Surface(s) of the second metallic film layer and/or the insulation film layer of the impulse generator is/are chemically or physically modified such that contact charges generated when the second metallic film layer is in contact with the insulation film layer under the action of external force increases, and thus the output capability of the electric generator is improved.

In addition, the impulse generator according to the present disclosure is able to provide DC current output through a bridge rectifying circuit. The impulse generator according to the present disclosure is simple and convenient in manufacture process and low in manufacture cost. The impulse generator according to the present disclosure has wide applications, and can be applied in densely-populated areas such as public square, stations, etc., where the impulse generator is driven, by trample forces once people pass by, to operate the indicator lights or charge the storage batteries.

The impulse generator and the impulse generator set according to the present disclosure may convert external forces such as trample forces by feet and beating forces into electric energy for powering small appliances without any additional power supplies such as electric batteries. Accordingly, it is a simple and convenient electric generator. Moreover, the impulse generator and the impulse generator set according to the present disclosure are simple and convenient in manufacture process and low in manufacture cost and have wide applications.

Although several exemplary embodiments have been shown and described, the present disclosure should not be construed as being limited to the embodiments set forth herein and it would be appreciated by those skilled in the art that various changes or modifications may be made in these embodiments without departing from the principles and spirit of the disclosure, the scope of which is defined in the claims and their equivalents.

What is claimed is:

1. An impulse generator comprising:
   A first substrate;
   A first conductive film layer on the first substrate;
   An insulation film layer on the first conductive film layer;
   A second substrate;
   A second conductive film layer on the second substrate; and
   An elastic connection body for connecting the first substrate with the second substrate such that the insulation film layer and the second conductive film layer face each other;
   Wherein, when no external force is applied on the first substrate or the second substrate, the insulation film layer is separated from the second conductive film layer, and a distance between the insulation film layer and the second conductive film layer is greater than a thickness of the insulation film layer by one or more orders of magnitude; and
   When an external force is applied on the first substrate or the second substrate, the insulation film layer contacts with the second conductive film layer to generate a surface charge transfer between the insulation film layer and the second conductive film layer.

2. The impulse generator according to claim 1, wherein at least one surface among the second conductive film layer and the insulation film layer is distributed with microstructure array in micron or submicron dimension.

3. The impulse generator according to claim 1, wherein at least one surface among the second conductive film layer and the insulation film layer is chemically modified such that a functional group which is prone to lose electrons is introduced into a positive polarity material surface, or a functional group which is prone to accept electrons is introduced into a negative polarity material surface.

4. The impulse generator according to claim 1, wherein a surface of the second conductive film layer and a surface of the insulation film layer are chemically modified such that positive charges are introduced into a positive polarity material surface and negative charges are introduced into a negative polarity material surface.

5. The impulse generator according to claim 1, wherein, the second conductive film layer has the same shape as that of the insulation film layer such that, when an external force is applied to the first substrate or the second substrate, the insulation film layer is completely in contact with the second conductive film layer.

6. The impulse generator according to claim 1, wherein, the elastic connection body comprises one or more springs distributed around the insulation film layer.

7. The impulse generator according to claim 1, wherein, the first substrate or the second substrate is an organic glass sheet, PE sheet or PVC sheet.

8. The impulse generator according to claim 1, wherein, the second conductive film layer is a flat and smooth metal aluminum or metal copper film layer.

9. The impulse generator according to claim 1, wherein, the insulation film layer is polytetrafluoroethylene film or polydimethylsiloxane film.

10. The impulse generator according to claim 1, wherein, the first conductive film layer is a metal aluminum or metal copper film layer.

11. The impulse generator according to claim 1, wherein, the insulation film layer is polydimethylsiloxane and the second conductive film layer is a metal aluminum film.

12. The impulse generator according to claim 1, wherein, the elastic connection body comprises a ring of elastic material attached to the second substrate, around the second conductive film layer.

13. An impulse generator set, comprising a plurality of impulse generators according to claim 1 stacked vertically with one another; wherein,
   in every two adjacent impulse generators of the plurality of impulse generators, a first impulse generator is on a second impulse generator, wherein the second substrate of the first impulse generator is the first substrate of the second impulse generator; and
   series connections and/or parallel connections are formed among the plurality of impulse generators.

14. The impulse generator set according to claim 13, wherein, the first conductive film layers of all of the plurality of impulse generators are connected together through a conductive structure, and the second conductive film layers of all of the plurality of impulse generators are connected together through a conductive structure.

15. The impulse generator set according to claim 13, wherein, in every two adjacent impulse generators of the plurality of impulse generators, the second conductive film layer of the first impulse generator is connected with the first conductive film layer of the second impulse generator, through a conductive structure.

16. An impulse generator set, comprising a plurality of impulse generators according to claim 1 stacked vertically with one another; wherein
   in every two adjacent impulse generators among the plurality of impulse generators, a first impulse generator is on a second impulse generator, wherein the second substrate of the first impulse generator is the first substrate of a subsequent second impulse generator; and series connections or parallel connections are formed among the plurality of impulse generators.

17. The impulse generator set according to claim 16, wherein, the first conductive film layers among the plurality of impulse generators are connected together through a conductive structure, and the second conductive film layers among the plurality of impulse generators are connected together through a conductive structure.

18. The impulse generator set according to claim 16, wherein in every two adjacent impulse generators among the plurality of impulse generators, the second conductive film layer of the first impulse generator is connected with the first conductive film layer of the second impulse generator through a conductive structure.

* * * * *